United States Patent
Lee et al.

(10) Patent No.: US 12,441,190 B2
(45) Date of Patent: Oct. 14, 2025

(54) DISPLAY TYPE CONTROL DEVICE

(71) Applicant: HYUNDAI MOBIS CO., LTD., Seoul (KR)

(72) Inventors: Hyun Jee Lee, Yongin-si (KR); Tae Kyoung Yoon, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 367 days.

(21) Appl. No.: 18/156,334

(22) Filed: Jan. 18, 2023

(65) Prior Publication Data

US 2024/0181886 A1 Jun. 6, 2024

(30) Foreign Application Priority Data

Dec. 6, 2022 (KR) .................. 10-2022-0168474

(51) Int. Cl.
*B60K 35/60* (2024.01)
*B60K 35/22* (2024.01)
*B60K 35/50* (2024.01)

(52) U.S. Cl.
CPC ............. *B60K 35/60* (2024.01); *B60K 35/22* (2024.01); *B60K 35/50* (2024.01); *B60K 2360/46* (2024.01); *B60K 2360/816* (2024.01)

(58) Field of Classification Search
CPC .... H05K 5/0017; H05K 5/0217; B60K 35/10; B60K 35/22; B60K 35/50; B60K 35/60; G06F 3/00; G06F 3/0304; G06F 3/0308; G06F 3/0416
USPC .................. 361/807–810, 752–759
See application file for complete search history.

(56) References Cited

U.S. PATENT DOCUMENTS

| | | | | |
|---|---|---|---|---|
| 5,497,289 A | * | 3/1996 | Sugishima | H05K 7/209 361/600 |
| 9,012,794 B2 | * | 4/2015 | Hisada | G05G 1/08 200/11 R |
| 10,096,438 B2 | * | 10/2018 | Yamamoto | H01H 9/181 |
| 2005/0224322 A1 | * | 10/2005 | Kikuya | H01H 9/181 200/11 R |
| 2010/0101363 A1 | * | 4/2010 | Hisada | G05G 1/105 74/507 |
| 2010/0270133 A1 | * | 10/2010 | Baker | H01H 25/041 200/4 |
| 2012/0075063 A1 | * | 3/2012 | Sakamoto | B60R 25/04 340/5.62 |

(Continued)

FOREIGN PATENT DOCUMENTS

| | | |
|---|---|---|
| JP | 2006-107913 | 4/2006 |
| JP | 2006-182284 | 7/2006 |
| JP | 2011-065468 | 3/2011 |

OTHER PUBLICATIONS

Korean Office Action dated Aug. 23, 2024 issued in KR 10-2022-0168474.

(Continued)

*Primary Examiner* — Tuan T Dinh
(74) *Attorney, Agent, or Firm* — DLA PIPER LLP US (57) ABSTRACT

A display type control device including a housing having a cavity formed therein, a display connected to an end of the housing, and a flexible cable disposed in the cavity of the housing and having an end connected to the display. The flexible cable has one surface on which a light emitting part for emitting light is disposed.

12 Claims, 10 Drawing Sheets

(56) References Cited

U.S. PATENT DOCUMENTS

| | | | | |
|---|---|---|---|---|
| 2013/0220779 | A1* | 8/2013 | Kerner | H01H 25/06 200/4 |
| 2016/0086577 | A1* | 3/2016 | Broadbent | G06F 3/04817 345/690 |
| 2017/0352608 | A1* | 12/2017 | Sueyoshi | H05K 7/20145 |
| 2021/0272424 | A1* | 9/2021 | Trudnak | G01K 1/06 |

OTHER PUBLICATIONS

Korean Office Action dated May 31, 2024 issued in KR 10-2022-0168474.

* cited by examiner

DISPLAY TYPE CONTROL DEVICE

Pursuant to 35 U.S.C. § 119(a), this application claims the benefit of earlier filing dates and right of priority to Korean Application No. 10-2022-0168474, filed on Dec. 6, 2022, the contents of which are hereby incorporated by reference herein in their entirety.

BACKGROUND OF THE DISCLOSURE

Field of the Disclosure

The present embodiments relate to a display type control device and, more particularly, to a display type control device applied to a center fascia of a vehicle and utilized to control various functions of the vehicle.

Discussion of the Related Art

In relation to a vehicle, various functions for ensuring driving convenience are being applied to the interior and exterior of the vehicle. For example, switches, buttons, dials, knobs, or display panels, related to these functions, are provided for convenience of a driver.

A display panel includes a liquid crystal display (LCD) therein to improve driver or occupant visibility and manipulability, and a printed circuit board (PCB) substrate is located therein to turn on a backlight according to user manipulation. Therefore, when the backlight mounted on the PCB substrate is turned on, light passes through the LCD and is emitted to the outside, so that a user may recognize information displayed on the display panel.

Meanwhile, the display panel may be mounted inside a control device such as a switch, a button, or a dial, and information according to control of the control device may be displayed to increase user convenience. For example, when a user rotates a dial for air conditioning control, the display panel of the dial may display a set temperature.

Figure 1:
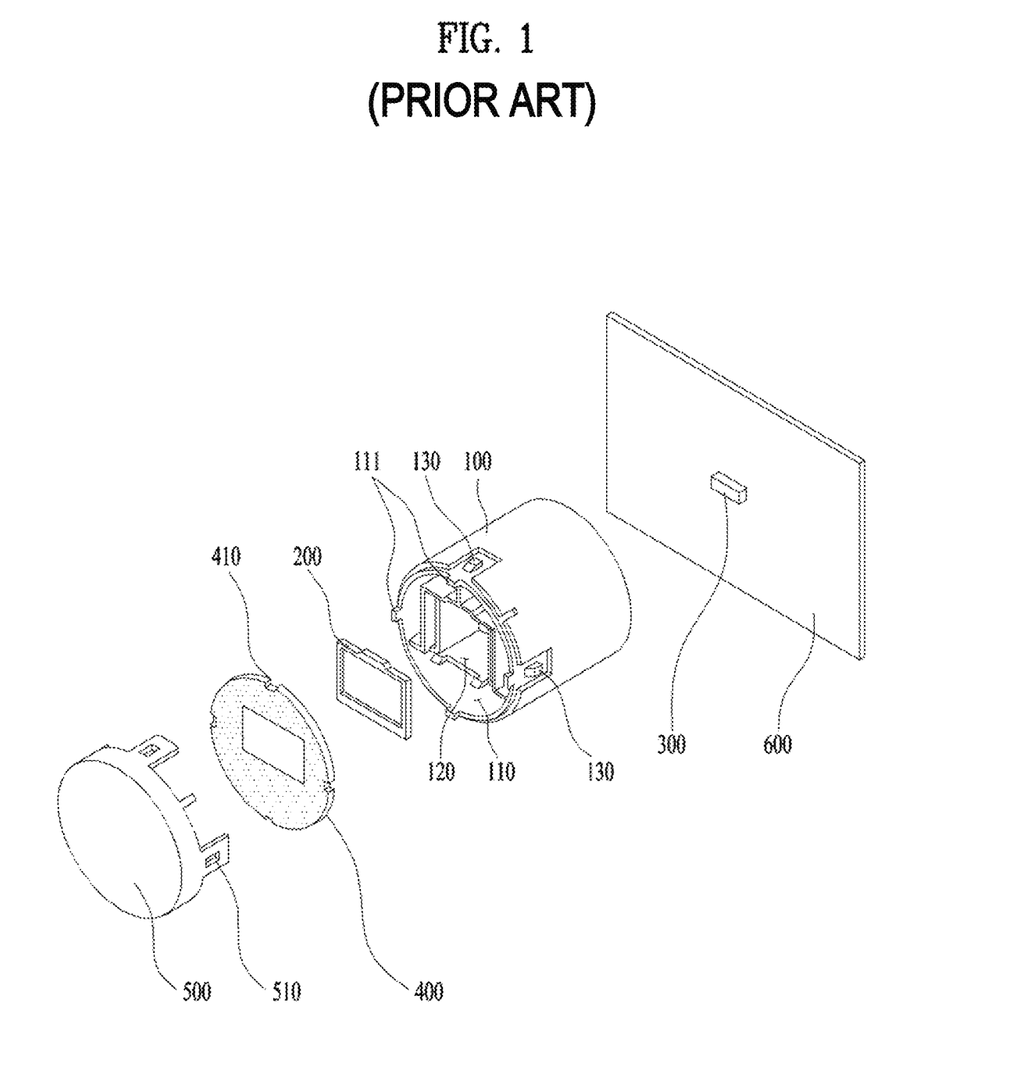
FIG. 1 is a schematic exploded view of a conventional control device.

Referring to FIG. 1, in a conventional control device, the amount of light arriving at a display 200 decreases as a distance between a light emitting body 300 (e.g., backlight) mounted in a substrate (e.g., a PCB) and the display 200 (e.g., liquid crystal display (LCD)) increases, so that visibility of information output on a screen deteriorates. Although the structure of control devices (e.g., buttons, knobs, etc.) disposed according to the structure of a center fascia may be changed/modified in various forms, the shapes of the control devices may be limited in consideration of the aforementioned visibility issue.

In particular, when a button and a knob related to air conditioning use one PCB substrate, a distance between a light emitting body and a display of the knob increases as the length of the knob increases. Accordingly, brightness and uniformity of illumination of the display are insufficient, which becomes a factor limiting the design of the shape of the knob. In addition, if a separate substrate is configured for the knob, additional components are needed and cost increases.

In relation to the above problems, an object of embodiments of the present disclosure is to provide a display type control device with improved visibility regardless of design.

Another object of embodiments of the present disclosure is to provide a display type control device capable of securing visibility regardless of the structure of a center fascia.

The objects to be achieved by the present disclosure are not limited to what has been particularly described herein above and other objects not described herein will be more clearly understood by persons skilled in the art from the following detailed description.

SUMMARY OF THE DISCLOSURE

According to an aspect of the present disclosure, provided herein is a display type control device, including a housing having a cavity formed therein, a display connected to an end of the housing, and a flexible cable disposed in the cavity of the housing and having an end connected to the display. The flexible cable has one surface on which a light emitting part for emitting light is disposed. The housing may further include a guide configured to guide a position of the flexible cable.

The flexible cable may have a first section formed at a position separated from the display by a preset distance, and the first section may be disposed perpendicular to an axial direction of the housing. The light emitting part may be connected to one surface of the first section of the flexible cable.

The display type control device may further include a fixing plate disposed inside the housing in a direction perpendicular to an axial direction of the housing and contacting another surface of the first section.

The display type control device may further include a light collector positioned between the display and the light emitting part and configured to guide light emitted from the light emitting part to the display. The light collector may have a funnel shape and a cross-sectional area of a light path becomes wider from the light emitting part to the display.

The housing may include a first housing and a second housing, the first housing may be positioned inside the second housing and include a first guide configured to guide a position of a second section of the flexible cable. The second section of the flexible cable may indicate a section from the first section to the end of the flexible cable.

The second housing may include a second guide configured to guide a position of a third section of the flexible cable, and the third section of the flexible cable may indicate a section from the first section to another end of the flexible cable. The first guide and the second guide may be configured to guide the second section and the third section of the flexible cable, respectively.

The light emitting part may include a light emitting diode (LED). The flexible cable may include a flexible printed circuit (FPC).

The light collector may be disposed inside the first housing, and color of a surface of the light collector onto which light is reflected may be white.

The first housing may include a plurality of locking pieces formed at an end portion of the first housing, the fixing plate may be fixed to the end portion of the first housing by the plurality of locking pieces, and a material of the fixing plate may include metal.

The other end of the flexible cable may be connected to a circuit substrate.

In another aspect of the present disclosure, provided herein is a display type control device, including a display, a housing having an end connected to the display, a fixing plate formed inside the housing and disposed perpendicular to an axial direction of the housing, and a flexible cable having an end connected to the display and including a light emitting part. The light emitting part emits light toward the display, and the fixing plate supports a position of the light emitting part.

In another aspect of the present disclosure, provided herein is a display type control device, including a display, a housing having an end in which the display is seated, a flexible printed circuit (FPC) cable having an end connected to the display and disposed inside the housing, and a light emitting part configured to emit light toward the display and connected to a partial section of the FPC cable. The housing includes a guide configured to guide arrangement of the FPC cable.

According to any one of embodiments of the present disclosure, a display type control device with improved visibility and manipulability may be provided.

According to any one of embodiments of the present disclosure, since restrictive factors of design according to use of a display are removed, shapes of various control devices capable of being arranged in a center fascia may be diversified.

The effects that are achievable by the present disclosure are not limited to what has been particularly described hereinabove and other advantages not described herein will be more clearly understood by persons skilled in the art from the following description.

DETAILED DESCRIPTION OF THE DISCLOSURE

Advantages and features of the present disclosure and methods to achieve the same will be apparent from the following detailed description of embodiments taken in conjunction with the accompanying drawings. The present disclosure may, however, be exemplified in many different ways and should not be construed as being limited to the examples disclosed herein. Rather, these examples are provided so that this disclosure will be through and complete, and will fully convey the concepts of the present disclosure to those of ordinary skill in the art, and the present disclosure is only defined by the accompanying claims and equivalents thereto.

The terms used in the present specification are used in order to describe embodiments, but are not intended to limit the scope of the present disclosure. As used in the present specification, a singular form may also include a plural form, unless otherwise defined contextually. Moreover, "comprise" and/or "comprising" does not exclude the presence of one or more of other elements. Like numbers refer to like elements throughout the specification. As used herein, the term "and/or" includes any and all combinations of one or more of the associated listed elements. In the present specification, terms such as "first" or "second" are used in order to describe a variety of elements, but it is apparent that such elements should not be limited to the scope of terms. The terms are used solely for the purpose of distinguishing one element from another. Accordingly, it is apparent that a first element mentioned hereinbelow could be termed a second element, without departing from the scope of the present disclosure.

Unless otherwise defined, all terms (including technical and scientific terms) used herein have the same meaning as commonly understood by one of ordinary skill in the art to which the present disclosure belongs. Terms, such as those defined in commonly used dictionaries, are not to be interpreted in an idealized or overly formal sense unless expressly so defined herein.

Spatially relative terms, such as "below," "beneath," "lower," "above," "upper," and the like, may be used herein to easily describe the correlation between one element and another element as illustrated in the figures. The spatially relative terms should be understood as the terms that encompass different orientations of elements in additional usage or operation of the orientations illustrated in figures. For example, when an element illustrated in the figures is turned over, the element described as disposed "below" or "beneath" another element may be disposed "above" the other element. Accordingly, the exemplary term "below" or "beneath" may encompass orientations of both below and above. The element may be oriented in other orientations, and the spatially relative terms used herein may be interpreted accordingly.

Figure 2:
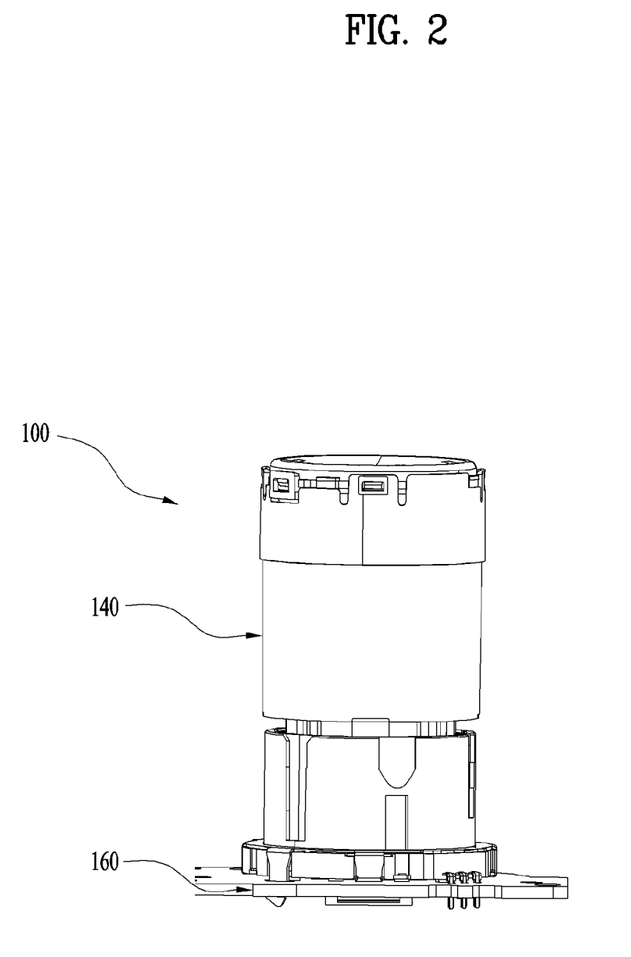
FIG. 2 illustrates a display type control device according to embodiments of the present disclosure.
Figure 3:
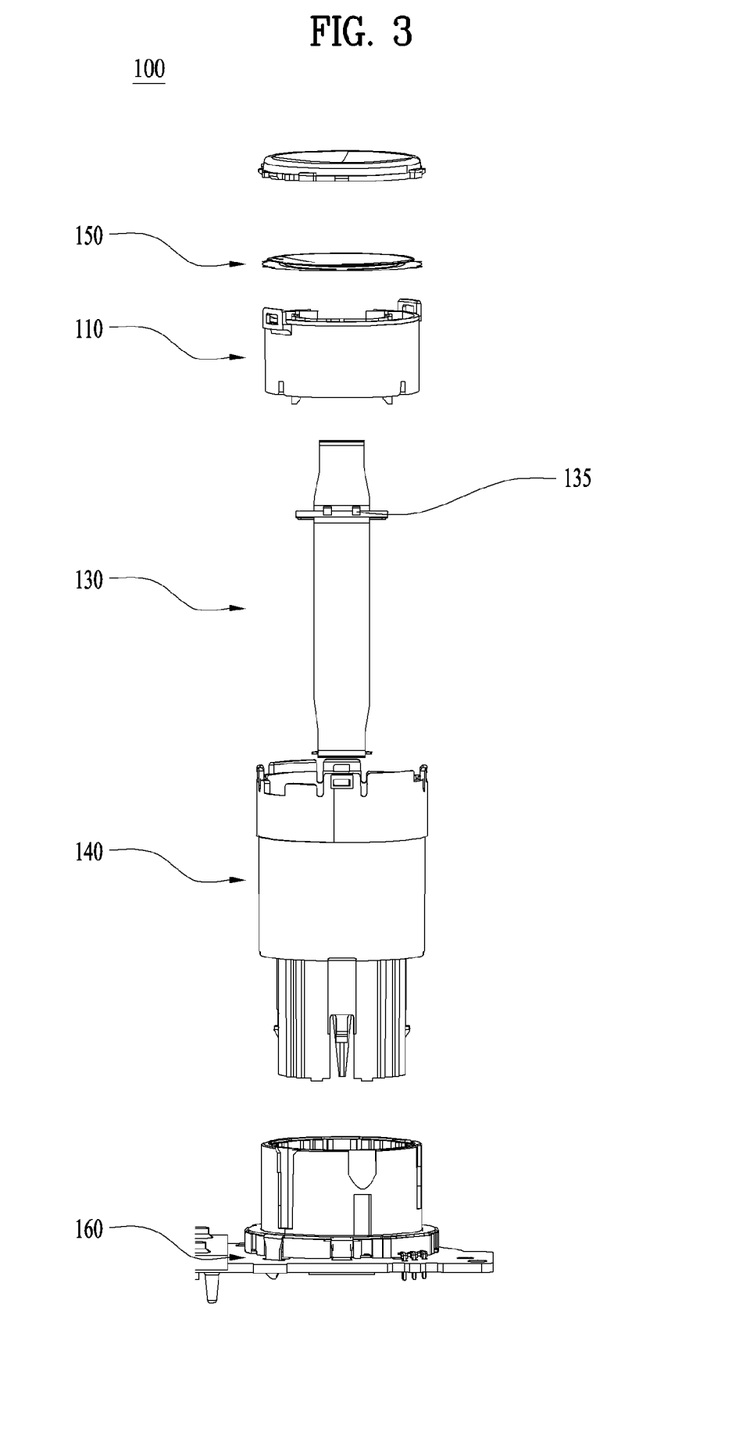
FIG. 3 is an exploded view of the display type control device according to embodiments of the present disclosure.
Figure 4:
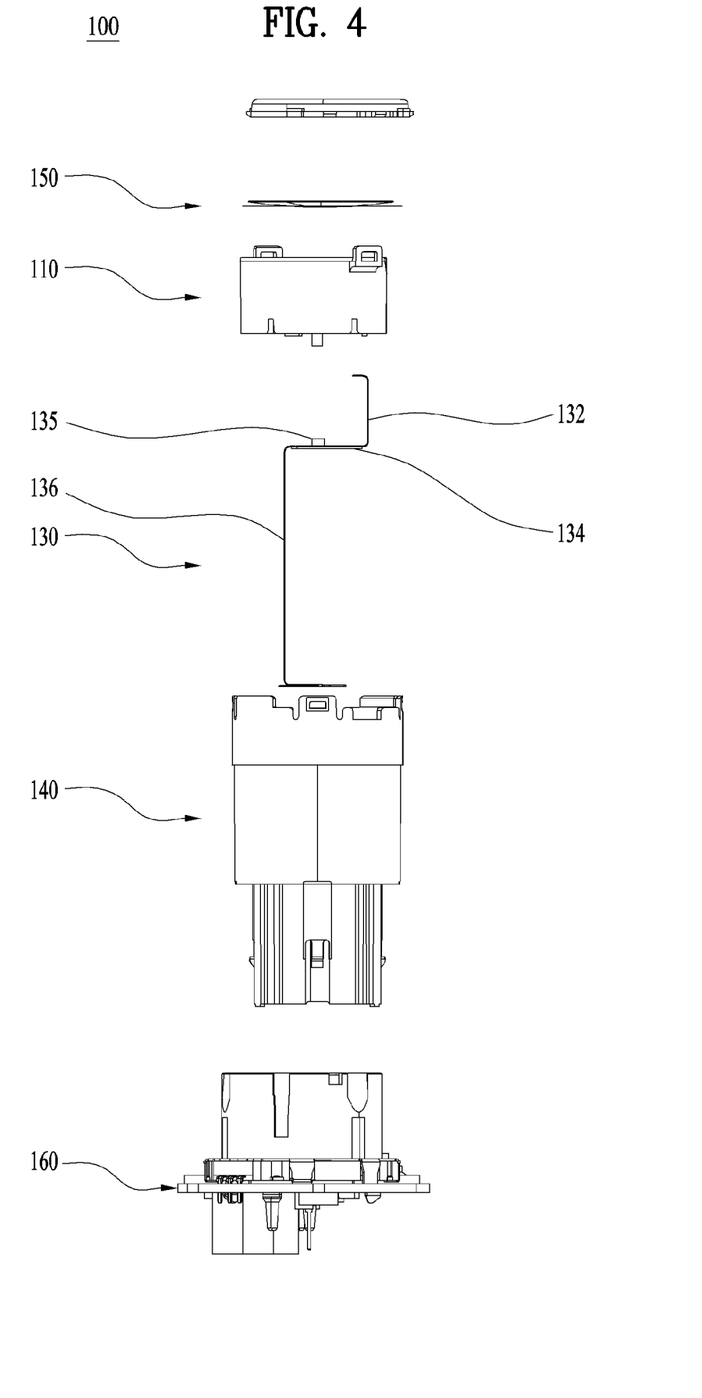
FIG. 4 illustrates the display type control device of FIG. 3 viewed in an axial direction.

FIG. 2 illustrates a display type control device (hereinafter referred to as "control device") 100 according to embodiments of the present disclosure. FIGS. 3 and 4 illustrate exploded views of the control device 100.

The control device 100 is a device used by a driver and an occupant of a vehicle to conveniently control functions of the vehicle and may be disposed on a center fascia or a dashboard of the vehicle. The control device 100 may be applied to knobs, buttons, or dials that control the volume of an audio video navigation system (AVN) of the vehicle or control airflow strength or temperature of an air conditioning system of the vehicle. In explaining embodiments of the present disclosure, a description of unnecessary parts, i.e., a description of known components applied to a typical control device, will be omitted for explanation of the technical idea of the present disclosure.

Referring to FIGS. 2 to 4, the control device 100 may include a first housing 110, a second housing 140, a display 150, a flexible cable 130, and/or a circuit substrate 160.

The display 150 may be referred to as a display unit, a display module, etc. and includes, for example, a liquid crystal display (LCD) that displays the state of a function controlled by the control device 100. The display 150 may be formed of a combination of elements constituting a typical display unit, such as a cover, a lens, an LCD liquid crystal, a diffuser sheet, and an optically clear adhesive (OCA).

The flexible cable 130 may include a cable having flexible characteristics such as a flexible printed circuit (FPC) or a flexible flat circuit (FFC). One end of the flexible cable 130 is connected to the display 150 and the other end thereof is connected to the circuit substrate 160 so that the display 150 transmits a signal for displaying a screen. The circuit substrate 160 may represent a PCB.

The flexible cable 130 is located in an inner cavity of the housing, and the position thereof may be guided by the housing. A guide structure formed in the housing to guide the flexible cable 130 will be described later.

The flexible cable 130 may be divided into a plurality of parts. The flexible cable 130 may be positioned parallel to the display 150 at a position at which a central portion of the cable is separated from the rear surface of the display 150 by a predetermined distance. A direction parallel to the display 150 may mean a direction perpendicular to an axial direction of the housing.

A portion of the flexible cable 130 arranged parallel to the display 150 may be referred to as a first section 134. In addition, a portion of the flexible cable 130 connected between the display 150 and the first section 134 may be referred to as a second section 132. The second section 132 of the flexible cable 130 represents a section from the first section 134 to an end of the flexible cable 130. A portion of the flexible cable 130 connected between the circuit substrate 160 and the first section 134 may be referred to as a third section 136. That is, the third section 136 of the flexible cable 130 may represent a section from the first section 134 to the other end of the flexible cable 130.

The second section 132 and the third section 136 of the flexible cable 130 are disposed parallel to an axial direction of the housing and may be guided by the housing.

The first section 134 of the flexible cable 130 has an one surface connected to a light emitting part 135. Specifically, the light emitting part 135 is connected to the surface of the first section 134 facing the display 150. The light emitting part 135 emits light according to a signal transmitted from the circuit substrate 160, and the emitted light is directed to the display 150. Light emitted from the light emitting part 135 passes through the display 150 so that information may be displayed on the screen of the display 150. The light emitting part 135 includes a light emitting diode (LED), and a known typical light emitting body may be applied thereto.

Each of the first and second housings 110 and 140 may contain a cavity therein to accommodate other elements. The display 150 may be connected to one end of each of the first and second housings 110 and 140 and seated in the first and second housings 110 and 140. The flexible cable 130 connected to the display 150 may pass through the first and second housings 110 and 140 and be connected to the circuit substrate 160.

The housing includes the first housing 110 and the second housing 140.

Figure 5A:
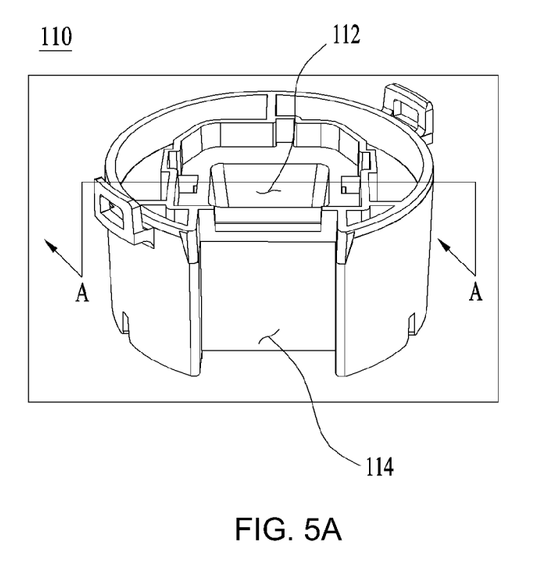
FIGS. 5A and 5B are a perspective view and a cross-sectional view of a first housing of the display type control device according to embodiments of the present disclosure, respectively.
Figure 5B:
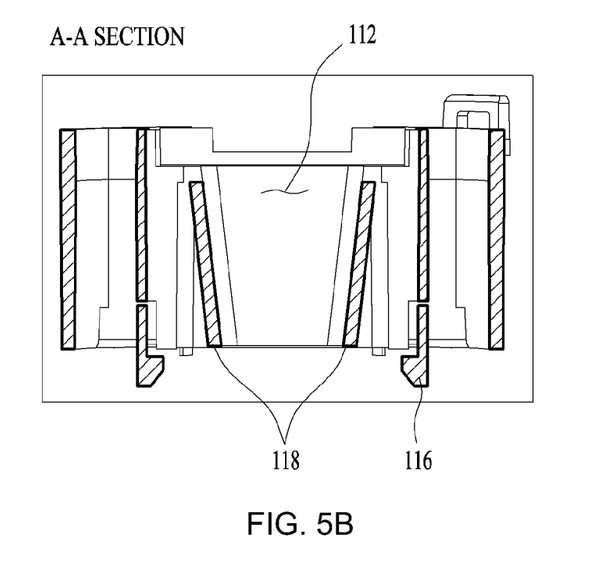

FIGS. 5A and 5B are a perspective view and a cross-sectional view of the first housing 110, respectively.

Referring to FIGS. 5A and 5B, the first housing 110 includes a cavity 112 formed therein along an axial direction. In addition, the first housing 110 includes a first guide 114 for guiding the second section 132 of the flexible cable 130. The first guide 114 may be provided as a groove formed on an outer surface of the first housing 110 along a longitudinal direction (or an axial direction of the housing). Accordingly, a portion (e.g., the second section 132) of the flexible cable 130 may be disposed along the first guide 114 so that the position of the second section 132 of the flexible cable 130 may be guided. The first guide 114 may be formed as a path formed inside the housing, and various guide types may be applied thereto.

In addition, the first housing 110 may include a plurality of locking pieces 116 formed at an end portion opposite to a part in which the display 150 is seated. The locking pieces 116 are elements supporting the first section 134 of the flexible cable 130 and may be formed to be coupled to a fixing plate 120 in a fitting coupling manner. The fixing plate 120 is made of a metal material and contacts and supports the first section 134 of the flexible cable 130 while an edge thereof is inserted into the locking pieces 116. In this case, the fixing plate 120 inserted by the locking pieces 116 is disposed inside the housing in a direction perpendicular to the axial direction of the housing. The fixing plate 120 may be connected to the end portion of the first housing 110 by the locking pieces 116.

The first section 134 of the flexible cable 130 has one surface connected to the light emitting part 135 and has the other surface supported in contact with the fixing plate 120. The fixing plate 120 may effectively emit heat generated from the light emitting part 135 connected to the first section 134 of the flexible cable 130.

In this embodiment, the fixing plate 120 is provided in a flat plate shape. However, the shape of the fixing plate 120 may be curved according to the curvature of the display 150. When the screen of the display 150 has a curvature, the fixing plate 120 may form a curvature in correspondence to the screen of the display 150, so that light emitted from the light emitting part 135 may effectively reach the display 150.

The first housing 110 may further include a light collector 118 therein. The light collector 118 guides a path of light so that light emitted from the light emitting part 135 effectively reaches the display 150. The light collector 118 is formed of outer walls surrounding the light emitting part 135, and a path through which light passes is formed as a space surrounded by the outer walls. The cross-sectional area of the path through which light passes gradually increases from the light emitting part 135 to the screen of the display 150, and the outer walls of the light collector 118 have a shape similar to a funnel. Accordingly, light generated from the light emitting part 135 is guided to the display 150 by the light collector 118. The outer walls of the light collector 118 may have a white surface onto which light is reflected, so that light reflectance may increase.

Figures 6A, 6B:
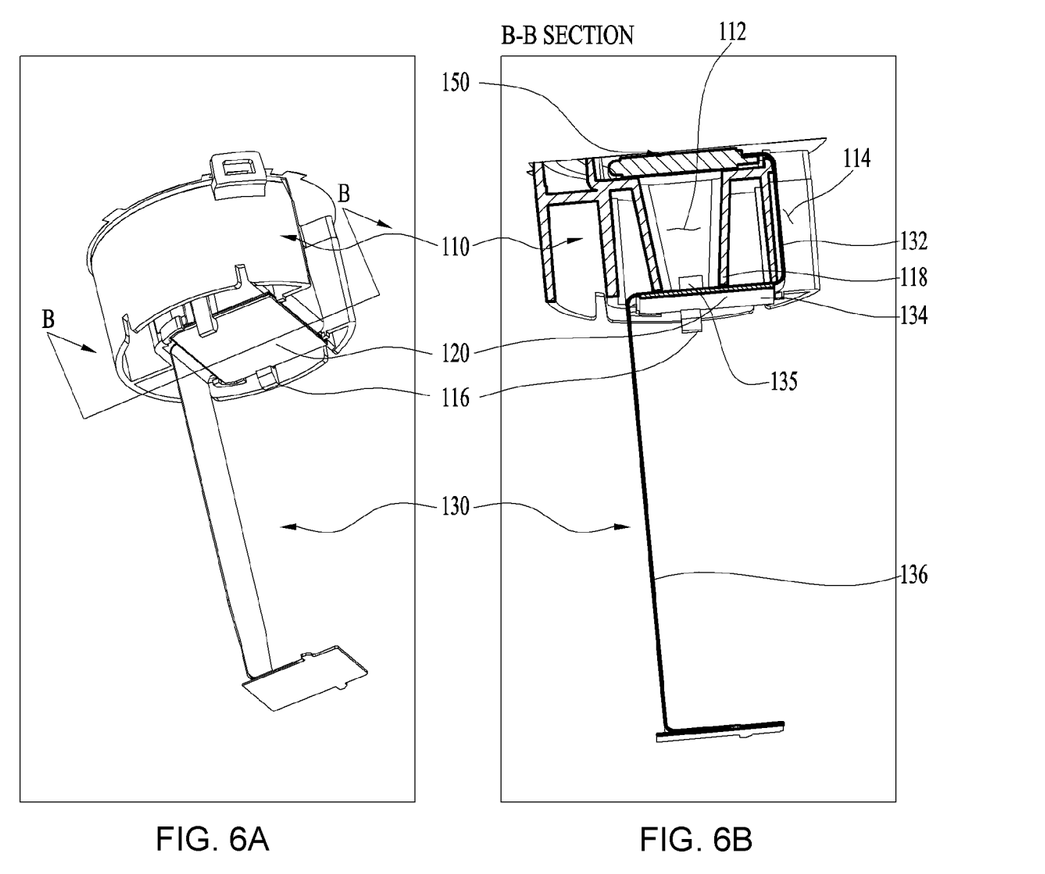
FIGS. 6A and 6B are a perspective view and a cross-sectional view of a state in which a first housing, a display, and a flexible cable are connected.

FIGS. 6A and 6B are a perspective view and a cross-sectional view of a state in which the first housing 110, the display 150, and the flexible cable 130 are connected.

Referring to FIGS. 6A and 6B, the display 150 is seated in an end of the first housing 110, and one end of the flexible cable 130 is connected to the display 150. As described above, the second section 132 of the flexible cable 130 is disposed parallel to the axial direction of the housing along the first guide 114 of the first housing 110. The first section 134 of the flexible cable 130 is positioned parallel to the display 150 at a position separated from the display 150 by a predetermined distance. That is, the first section 134 of the flexible cable 130 is disposed perpendicular to the axial direction of the housing. Therefore, when light is emitted from the light emitting part 135 connected to one surface of the first section 134, light may reach the display 150 at the shortest distance. A distance between the first section 134 and the display 150 may be appropriately changed based on the illuminance of the light emitting part 135.

The fixing plate 120 is fitted and coupled to the locking pieces 116 of the first housing 110 to support the first section 134 of the flexible cable 130. The third section 136 of the flexible cable 130 is disposed parallel to the axial direction of the housing and is connected to the circuit substrate 160. The third section 136 may be guided by the second housing 140 to be described later.

Figure 7A:
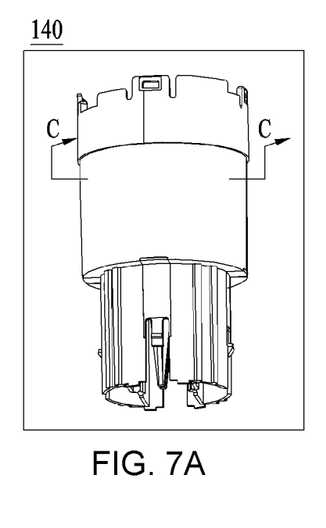
FIGS. 7A and 7B are a perspective view and a cross-sectional view of a second housing of the display type control device according to embodiments of the present disclosure.
Figure 7B:
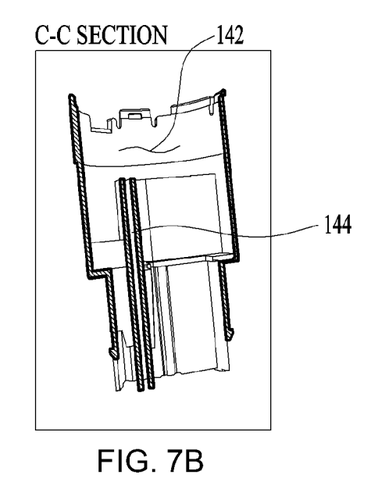
Figure 8:
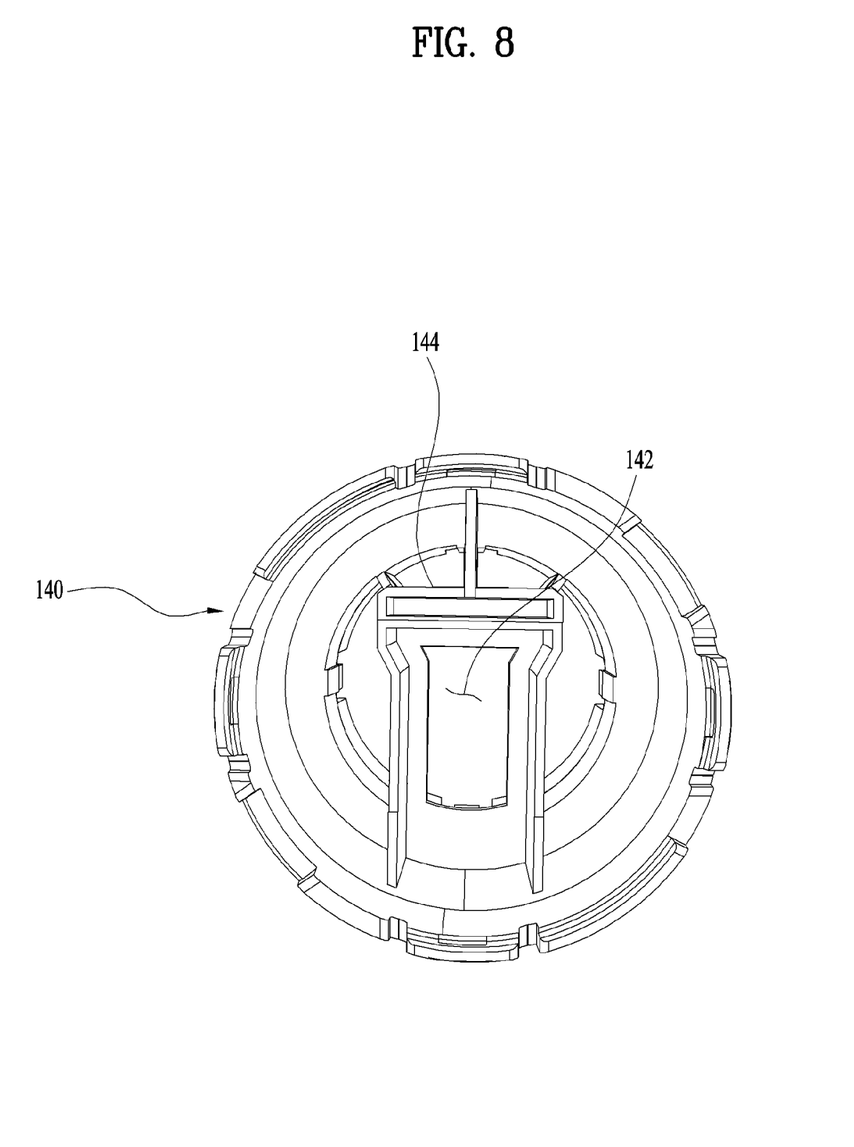
FIG. 8 illustrates a second housing viewed in the axial direction

FIGS. 7A and 7B are a perspective view and a cross-sectional view of the second housing 140 of the control device 100, respectively. FIG. 8 is a view of the second housing 140 viewed in the axial direction.

Referring to FIGS. 7A, 7B, and 8, the second housing 140 includes a cavity 142 capable of accommodating the first housing 110. In addition, the second housing 140 may include a second guide 144 formed therein to guide the position of the third section 136 of the flexible cable 130 therein. The cavity 142 is provided with an appropriate size to accommodate the first housing 110, and the second guide 144 is formed in the axial direction of the housing so that the flexible cable 130 is disposed parallel to the axial direction of the housing.

The second guide 144 may be provided with walls spaced apart from each other by a predetermined distance. The third section 136 of the flexible cable 130 is located between the walls of the second guide 144, so that the position of the third section 136 may be maintained constant.

In this embodiment, the first housing 110 and the second housing 140 are elements separated from each other. However, the first housing 110 and the second housing 140 may be configured as one integrated housing.

Figure 9A:
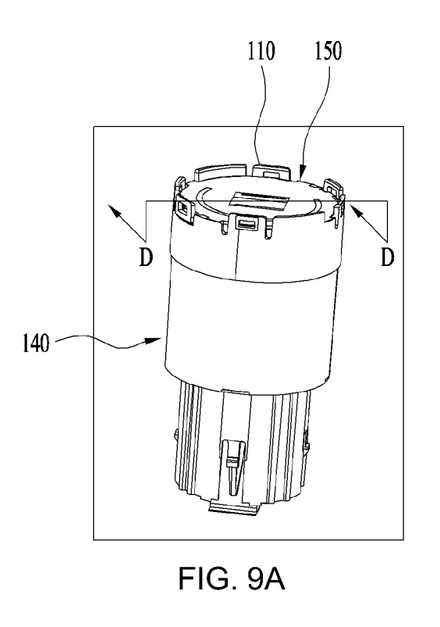
FIGS. 9A and 9B are a perspective view and a cross-sectional view of a state in which a first housing, a second housing, a display, and a flexible cable are connected.
Figure 9B:
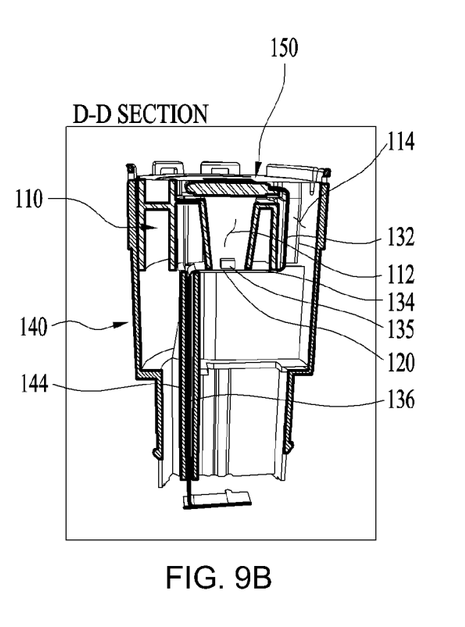

FIGS. 9A and 9B are a perspective view and a cross-sectional view of a state in which the first housing 110, the second housing 140, the display 150, and the flexible cable 130 are connected.

Referring to FIGS. 9A and 9B, the first housing 110 is seated in the cavity 142 inside the second housing 140. The first section 134 and the second section 132 of the flexible cable 130 are guided by the first housing 110, and the position (or arrangement) of the third section 136 of the flexible cable 130 is guided by the second guide 144 of the second housing 140 in parallel with the axial direction of the housing.

Figure 10A:
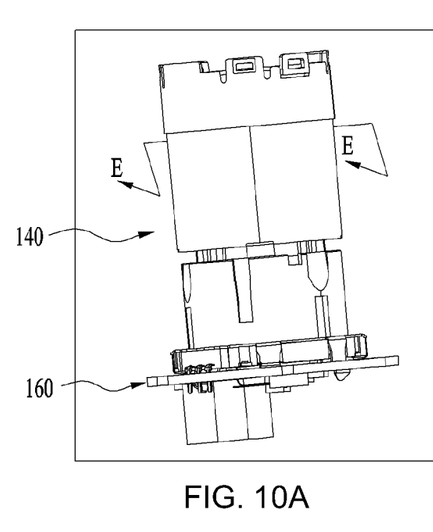
FIGS. 10A and 10B illustrate the display type control device according to embodiments of the present disclosure and a cross section thereof.
Figure 10B:
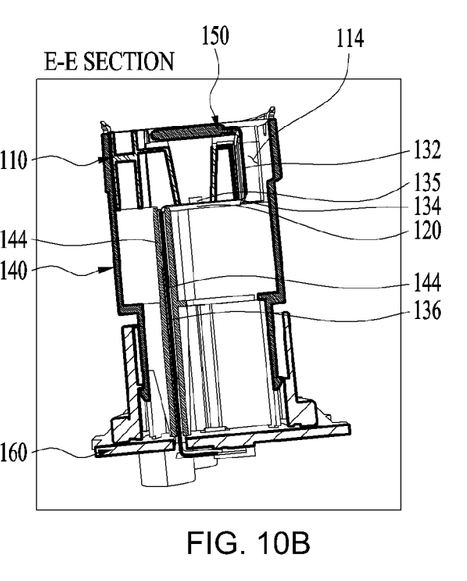

FIGS. 10A and 10B illustrate the control device 100 and a cross section of the control device 100, respectively.

Referring to FIG. 10, the third section 136 of the flexible cable 130 is disposed parallel to the axial direction of the housing and has an end portion connected to the circuit substrate 160.

As described above, the control device 100 may be applied to knobs, dials, buttons, or sticks for controlling an air conditioning device, an AVN system, or other functions of a vehicle and may be widely applied to various other fields. According to the present embodiments, visibility and manipulability of a display screen may be increased in various devices capable of displaying the state of a function through a display.

In addition, when designing buttons, knobs, dials, etc., disposed in a center fascia of a vehicle, the length of a specific button, knob, dial, etc. may be designed to be long without changing or separating the structure of a circuit substrate (e.g., a PCB). That is, restrictive factors of design are removed. Even if the length of the control device is long, since the location of the light emitting part may be arranged within a specific distance from the display, the screen display quality of the display may be maintained.

As described above, the detailed description of the embodiments of the present disclosure has been given to enable those skilled in the art to implement and practice the disclosure. Although the disclosure has been described with reference to the embodiments, those skilled in the art will appreciate that various modifications and variations may be made in the present disclosure without departing from the spirit or scope of the disclosure and the appended claims. For example, those skilled in the art may use constructions disclosed in the above-described embodiments in combination with each other.

Accordingly, the present disclosure should not be limited to the specific embodiments described herein, but should be accorded the broadest scope consistent with the principles and features disclosed herein.

What is claimed is:

1. A display type control device, comprising:
a housing having a cavity formed therein;
a display connected to an end of the housing;
a flexible cable disposed in the cavity and having an end connected to the display,
wherein the flexible cable has one surface on which a light emitting part for emitting light is disposed,
wherein the flexible cable has a first section formed at a position separated from the display by a preset distance, and the first section is disposed perpendicular to an axial direction of the housing,
wherein the light emitting part is connected to one surface of the first section of the flexible cable;
a fixing plate disposed inside the housing in a direction perpendicular to the axial direction of the housing and contacting another surface of the first section; and
a light collector positioned between the display and the light emitting part and being configured to guide light emitted from the light emitting part to the display,
wherein the housing further comprises a guide configured to guide a position of the flexible cable.

2. The display type control device of claim 1, wherein the light collector has a funnel shape and a cross-sectional area of a light path becomes wider from the light emitting part to the display.

3. The display type control device of claim 2,
wherein the housing comprises a first housing and a second housing,
the first housing is positioned inside the second housing and comprises a first guide configured to guide a position of a second section of the flexible cable, and
the second section of the flexible cable indicates a section from the first section to the end of the flexible cable.

4. The display type control device of claim 3, wherein the second housing comprises a second guide configured to guide a position of a third section of the flexible cable, the third section of the flexible cable indicating a section from the first section to another end of the flexible cable.

5. The display type control device of claim 4, wherein the first guide and the second guide are configured to guide the second section and the third section of the flexible cable, respectively.

6. The display type control device of claim 5, wherein the light emitting part comprises a light emitting diode (LED).

7. The display type control device of claim 5, wherein the flexible cable comprises a flexible printed circuit (FPC).

8. The display type control device of claim 5, wherein the light collector is disposed inside the first housing, and a color of a surface of the light collector onto which light is reflected is white.

9. The display type control device of claim 5,
wherein the first housing comprises a plurality of locking pieces formed at an end portion of the first housing, the fixing plate is fixed to the end portion of the first housing by the plurality of locking pieces, and
a material of the fixing plate comprises metal.

10. The display type control device of claim 5, wherein another end of the flexible cable is connected to a circuit substrate.

11. A display type control device, comprising:
a display;
a housing having an end connected to the display;
a fixing plate formed inside the housing and being disposed perpendicular to an axial direction of the housing;
a flexible cable having an end connected to the display and comprising a light emitting part,
wherein the light emitting part emits light toward the display, and the fixing plate supports a position of the light emitting part; and
a light collector positioned between the display and the light emitting part and being configured to guide light emitted from the light emitting part to the display,
wherein the housing further comprises a guide configured to guide a position of the flexible cable,
wherein the flexible cable has a first section formed at a position separated from the display by a preset distance, and the first section is disposed perpendicular to an axial direction of the housing,
wherein the light emitting part is connected to one surface of the first section of the flexible cable wherein the fixing plate is contacting another surface of the first section.

12. A display type control device, comprising:
a display;
a housing having an end in which the display is seated;
a flexible printed circuit (FPC) cable having an end connected to the display and disposed inside the housing;
a light emitting part configured to emit light toward the display and being connected to a partial section of the FPC cable,
wherein the housing comprises a guide configured to guide arrangement of the FPC cable,
wherein the FPC cable has a first section formed at a position separated from the display by a preset distance, and the first section is disposed perpendicular to an axial direction of the housing,
wherein the light emitting part is connected to one surface of the first section of the FPC cable;
a fixing plate disposed inside the housing in a direction perpendicular to the axial direction of the housing and contacting another surface of the first section; and
a light collector positioned between the display and the light emitting part and being configured to guide light emitted from the light emitting part to the display.

* * * * *